US007797634B2

(12) United States Patent
Wang

(10) Patent No.: US 7,797,634 B2
(45) Date of Patent: Sep. 14, 2010

(54) METHOD AND APPARATUS FOR DISPLAYING NETWORK FABRIC DATA

(75) Inventor: Pengyu Wang, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 2347 days.

(21) Appl. No.: 10/285,380

(22) Filed: Oct. 31, 2002

(65) Prior Publication Data

US 2004/0085348 A1 May 6, 2004

(51) Int. Cl.
G06F 15/177 (2006.01)
(52) U.S. Cl. ..................................... 715/736
(58) Field of Classification Search ................ 715/733, 715/734, 735, 736
See application file for complete search history.

(56) References Cited

U.S. PATENT DOCUMENTS

| 5,500,934 | A | | 3/1996 | Austin et al. |
| 5,974,457 | A | | 10/1999 | Waclawsky et al. |
| 6,014,715 | A | * | 1/2000 | Stoevhase .................... 710/11 |
| 6,145,098 | A | | 11/2000 | Nouri et al. |
| 6,151,023 | A | | 11/2000 | Chari |
| 6,181,776 | B1 | | 1/2001 | Crossley et al. |
| 6,272,537 | B1 | | 8/2001 | Kekic et al. |
| 6,381,635 | B1 | | 4/2002 | Hoyer et al. |
| 6,590,587 | B1 | * | 7/2003 | Wichelman et al. ......... 715/736 |
| 6,772,207 | B1 | | 8/2004 | Dorn et al. |
| 6,961,938 | B1 | | 11/2005 | Carwile et al. |
| 2003/0179227 | A1 | * | 9/2003 | Ahmad et al. ............... 345/736 |

OTHER PUBLICATIONS

Brocade Communication Systems, Inc., "Brocade® Fabric Manager User's Guide Version 3.0", Oct. 2001.
Cisco, "Cisco Fabric Manager Data Sheet", Sep. 6, 2002, pp. 1-8.

* cited by examiner

Primary Examiner—Thanh T Vu
(74) Attorney, Agent, or Firm—Wong, Cabello, Lutsch, Rutherford & Brucculeri LLP

(57) ABSTRACT

The invention relates to methods and associated systems for displaying network fabric data for managing electronic networks, such as computer networks, storage area networks (SANs), and the like. In one aspect, the invention provides a method for displaying parameters of a plurality of devices in a network for comparison, where each device has a plurality of parameters, including determining and storing values for a plurality of parameters for each of a plurality of devices, and displaying a table of said stored parameter values, where the parameters form a first dimension of the table and the devices form a second dimension of the table. As an example, methods may further include determining if values for a common parameter among devices are identical, and displaying the table without the parameter if all the values for the parameter are identical.

26 Claims, 7 Drawing Sheets

METHOD AND APPARATUS FOR DISPLAYING NETWORK FABRIC DATA

BACKGROUND OF THE INVENTION

1. Field of the Invention

The invention relates to methods and associated systems for displaying network fabric data for managing electronic networks, such as computer networks, storage area networks (SANs), and the like. Specifically, the invention provides a simplified means of managing large numbers of parameters associated with devices in such networks.

2. Description of the Related Art

The continuing development and implementation of electronic networks represents a growing challenge for managing the complex and dynamic operations of such systems. Computing, data storage, and communications networks are just a few examples of electronic networks for which new devices and methods of sharing data are continually developed and improved. Design objectives associated with electronic networks are often focused on performance. In some cases, such networks may require periodic maintenance and management to optimize performance and efficiency. Graphical user interfaces are generally employed to assist in monitoring network performance and communicating with and controlling the behavior of software-driven devices on a network. In some cases, the efficiency by which such an interface can be used to manage a network can actually impact the performance of the network, especially where a network system depends on operators to identify problems and conduct optimizations manually.

By way of example, computing and data storage networks illustrate various needs and objectives of network management through graphical user interfaces. The Fibre Channel family of standards (developed by the American National Standards Institute (ANSI)) defines a high speed communications interface for the transfer of large amounts of data between a variety of hardware systems such as personal computers, workstations, mainframes, supercomputers, storage devices and servers that have Fibre Channel interfaces. Use of Fibre Channel is proliferating in client/server applications which demand high bandwidth and low latency I/O such as mass storage, medical and scientific imaging, multimedia communication, transaction processing, distributed computing and distributed database processing applications.

Fibre Channel offers advantages over traditional channel and network technology. Conventional channel technology (e.g., telephony) provides a point-to-point connection (or service) form one device to another. Conventional channels deliver data with high speed and low latency. Channels, however, are not suited for providing connectivity among many clients and are not suited for small-packet bursty traffic. Conventional networks provide shared access to bandwidth and are designed to handle unpredictable and bursty traffic. Networks, however, are software intensive and are not able to meet the growing bandwidth requirements of many client/server applications.

Fibre Channel is an alternative to conventional channel and network connectivity technologies and is used to deliver high speed and low latency connectivity among many clients. Fibre Channel establishes logical point-to-point connectivity from a source device node (port) to a destination device node (port) (a logical port-to-port serial channel). The logical port-to-port serial channel is used to transfer data from a source device (node) to a destination device node. Each node (source and destination) has a buffer (either a send buffer or a receive buffer) and data transfer is effected by moving data from the send buffer at the source node to a receive buffer at the destination node. Because the transfer scheme is logically point-to-point (node-to-node) there is no need for Fibre Channel to handle various network protocols. With Fibre Channel, data is moved from one node to another without regard to data format or meaning.

Fibre Channel uses one of several topologies (e.g., a point to point topology, a fabric topology, or a loop topology) to establish a logical point-to-point serial channel. The Fibre Channel point to point topology connects two Fibre Channel systems directly. The Fibre Channel loop topology is an arbitrated loop with ring connections that provide arbitrated access to shared bandwidth. The Fibre Channel fabric topology uses a switching fabric built from one or more Fibre Channel switches to provide a bidirectional connection from one node to another. With the fabric topology, each Fibre Channel node (device) manages only a simple point-to-point connection between itself and the fabric and the fabric manages and effects the connection between the nodes. Each transmitting node (port) enters the address of a destination node (port) in a frame header and the fabric establishes the connection.

The devices that are coupled to form such a network generally include a variety of software-driven configurations, parameters, and logical instructions that can be managed to provide optimized performance of the network. In certain instances, a mismatch of such parameters can cause reconfiguration of the fabric. Additionally, it is very common for devices to be added to or removed from a given network. There is thus a continuing need for graphical user interfaces and methods of displaying various devices forming the network as well as operating information associated with the devices to facilitate efficient and convenient network management.

BRIEF SUMMARY OF THE INVENTION

The invention relates to graphical user interfaces for managing electronic networks, such as computer networks, storage area networks (SANs), and the like. Specifically, the invention provides a simplified means of managing large numbers of parameters associated with devices in such networks.

In a preferred embodiment, the invention provides a method for displaying parameters of a plurality of devices in a network for comparison, where each device has a plurality of parameters. The method may include at least the following steps: determining and storing values for a plurality of parameters for each of a plurality of devices; and displaying a table of said stored parameter values, where the parameters form a first dimension of said table and the devices form a second dimension of said table. As a further illustration, the first dimension of the table can be a row and the second dimension of the table can be a column.

In some cases, additional steps may include determining if values for a parameter for each of said plurality of devices are identical, and displaying the table without the parameter if all the values for the parameter are identical. In other cases, additional steps may include displaying in a first row of the table the plurality of parameters for a first device, and displaying in a second row of the table the plurality of parameters for a second device. As an example, the first device can be a baseline reference of a device at a first time, and the second device can be an updated comparison of the first device at a second time.

Some embodiments may also include rendering a first parameter common to the first and second devices in a first column; rendering a first value for the first parameter representing the first device in the first row; rendering a second value for the first parameter representing the second device in the second row; and altering the appearance of the second value in the display with respect to the first value when the values are not identical. As an example, the step of altering may include displaying the first value with a first color scheme, and displaying the second value with a second color scheme different from the first color scheme.

Embodiments of the invention may also include providing a menu of user selectable device parameters, wherein the step of determining includes determining a value of at least one parameter selected from the menu of user selectable device parameters, and wherein the table does not include non-user selected parameters.

In another aspect, the invention provides a method of displaying network device configuration data, including the following steps: determining, at a first time, a set of configuration parameters for a device, wherein the set includes at least one configuration parameter; storing the results of the step of determining at a first time as a baseline reference; determining, at a second time, the set of configuration parameters for the device; comparing the results of the step of determining at a second time with the baseline reference; and rendering onto a graphical user interface a table representing a comparison of the results of the step of determining at a second time with the baseline reference.

In another aspect, the invention provides a method of displaying network device configuration data, including the following steps: defining a group of devices according to user input from a graphical user interface, wherein the devices each have at least one configuration parameter; determining, at a first time, the interconnections and configuration parameters for the group of devices; storing the results of the step of determining at a first time as a baseline reference; determining, at a second time, the interconnections and configuration parameters for the group of devices; comparing the results of the step of determining at a second time with the baseline reference; and rendering onto the graphical user interface a table representing a comparison of the results of the step of determining at a second time with the baseline reference, wherein the table has a first dimension and a second dimension, wherein the group of devices are listed in the first dimension, and wherein at least one configuration parameter is listed for each device in the second dimension.

In another aspect, the invention provides a method of displaying network device configuration data, including the following steps: storing a baseline configuration for a device at a first time, wherein the configuration includes at least a first parameter of the device; determining an updated configuration for the device at a second time; and displaying onto a graphical user interface a comparison of the baseline configuration with the updated configuration, wherein the comparison includes a table having at least a first column and a second column, wherein the baseline configuration is rendered in a first row, wherein the updated configuration is rendered in a second row, and wherein the first parameter is provided in the first and second rows of the second column.

In another aspect, the invention provides a method of displaying network device configuration data, including the following steps: storing a baseline configuration for a device at a first time, wherein the baseline configuration includes at least a first parameter of the device; determining an updated configuration for the device at a second time; and displaying onto a graphical user interface a comparison of the baseline configuration with the updated configuration, wherein the comparison includes a table having at least a first column and a second column, wherein the baseline configuration is rendered in a first row, wherein the updated configuration is rendered in a second row, wherein the first parameter is provided in the first and second rows of the second column; and wherein a change of the first parameter between the baseline configuration and the updated configuration is indicated by an altered appearance of the first parameter rendered in the second row with respect to the appearance of the first parameter rendered in the first row.

Additional embodiments of the invention can include any of the features, aspects, or steps discussed herein, either alone or in combination. Advantages and other features of the invention will become apparent from the following description, drawings and claims.

DETAILED DESCRIPTION OF THE INVENTION

Figure 1:
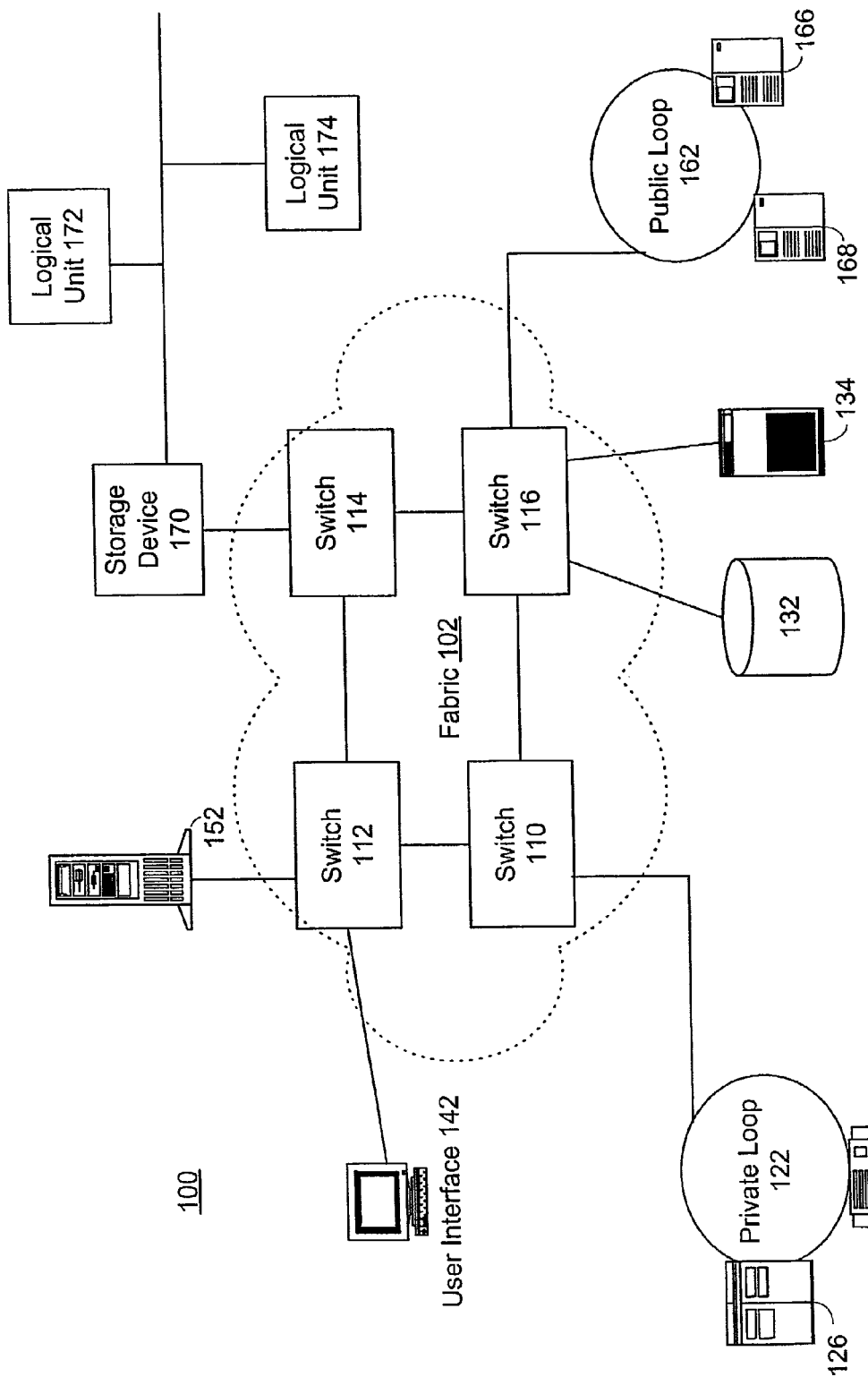
FIG. 1 is a general view of a SAN.

Referring now to FIG. 1, a storage area network (SAN) 100 is shown. A fabric 102 is the heart of the SAN 100. The fabric 102 is formed of a series of switches 110, 112, 114, and 116, preferably Fibre Channel switches according to the Fibre Channel specifications. The switches 110-116 are interconnected to provide a full mesh, allowing any nodes to connect to any other nodes. Various nodes and devices can be coupled to the fabric 102. For example a private loop 122 according to the Fibre Channel loop protocol is coupled to switch 110, with hosts 124 and 126 coupled to the private loop 122. That way the hosts 124 and 126 can communicate through the switch 110 to other devices. Storage unit 132, preferably a unit containing disks, and a tape drive 134 are coupled to switch 116. It will be appreciated that the term "coupled" refers generically to various types of electronic connections, including direct connections and indirect connections where devices are joined through a series of intermediate connections (e.g., through other devices). A user interface 142, such as a work station, is coupled to switch 112, as is an additional host 152. A public loop 162 is coupled to switch 116 with disk storage units 166 and 168, preferably RAID storage arrays, to provide storage capacity. A storage device 170 is shown as being coupled to switch 114, with the storage device 170 having a logical unit 172 and a logical unit 174. It is understood that this is a very simplified view of a SAN 100 with representative storage devices and hosts coupled to the fabric 102. It is understood that quite often significantly more devices and switches are used to develop the full SAN 100.

Figure 2:
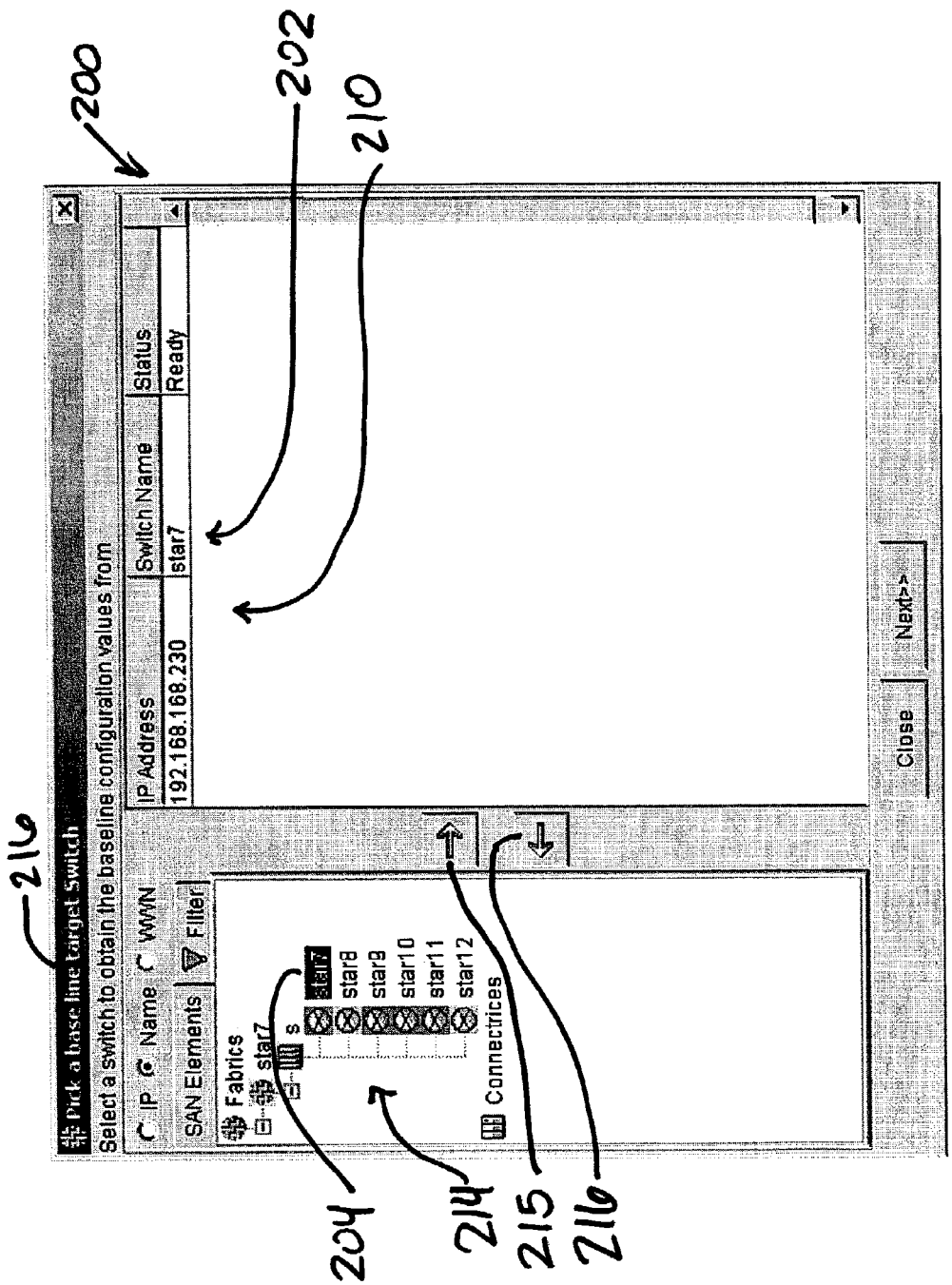
FIG. 2 is a view of a graphical user interface showing configuration parameters for a device in a network.

Referring to FIG. 2, a view is shown of a graphical user interface 200 showing configuration parameters 202 for a device 204 in a network. In this example, the interface 200 is a window from a Microsoft Windows™ operating system. While the present invention is generally illustrated herein through examples operating in a Microsoft Windows™ environment, it will be appreciated that the invention also applies to other types of computer systems and operating environments. The display of the parameters 202 is in table format and is referred to as table 210. In other examples, a table such as table 210 can have more than one row (as shown in FIG. 2). Depending on the device (e.g., device 204) selected in expandable tree 214, the table 210 may include multiple rows comparing various devices or comparing the parameters of a single device at different times. In this example, the device 204 is part of an expandable tree 214 of network components that allows a user to select the part of the network that the information in the table 210 relates to.

Figure 3:
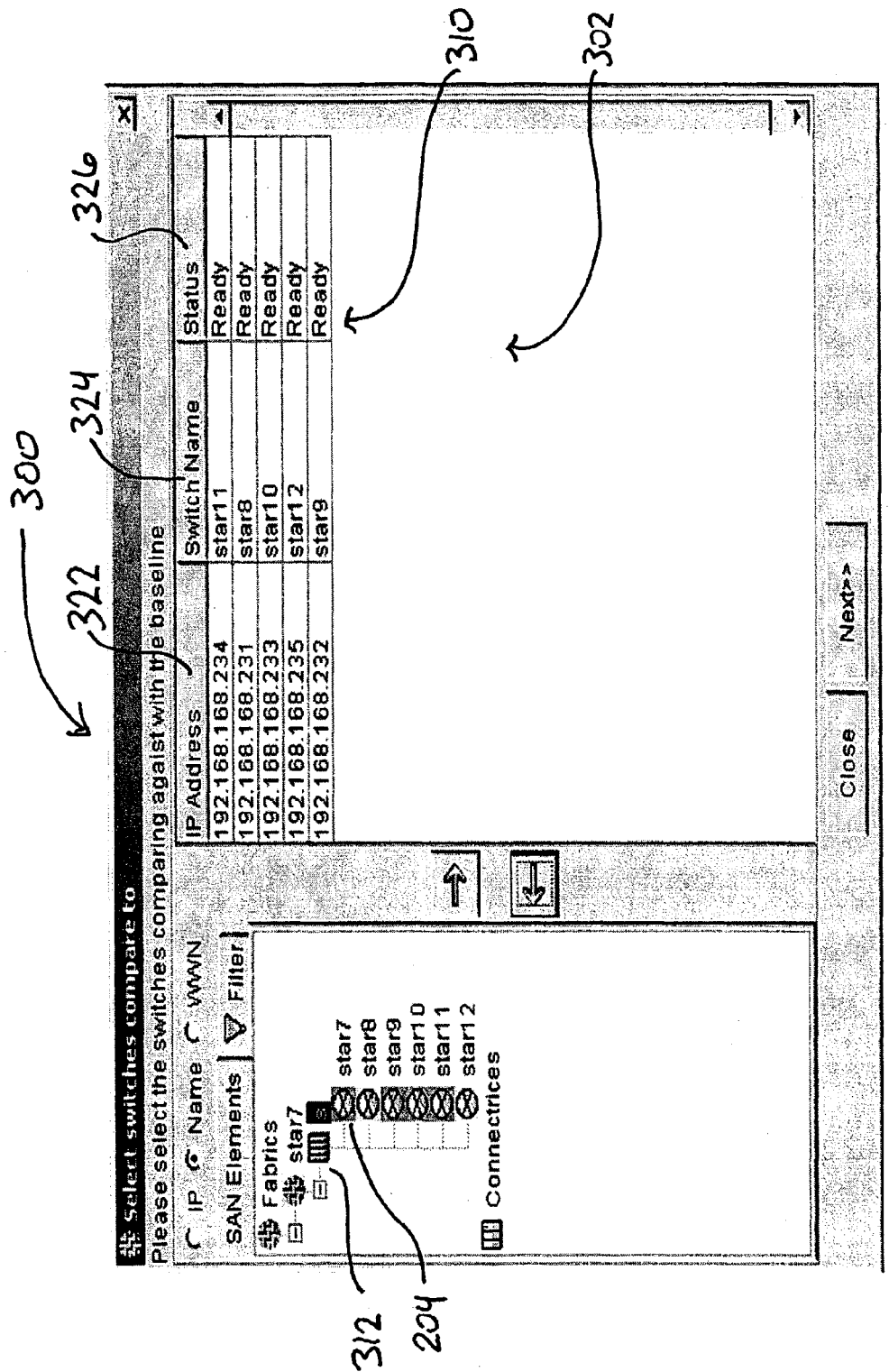
FIG. 3 is a view of a graphical user interface showing a table of configuration parameters for a group of devices in a network.
Figure 5:
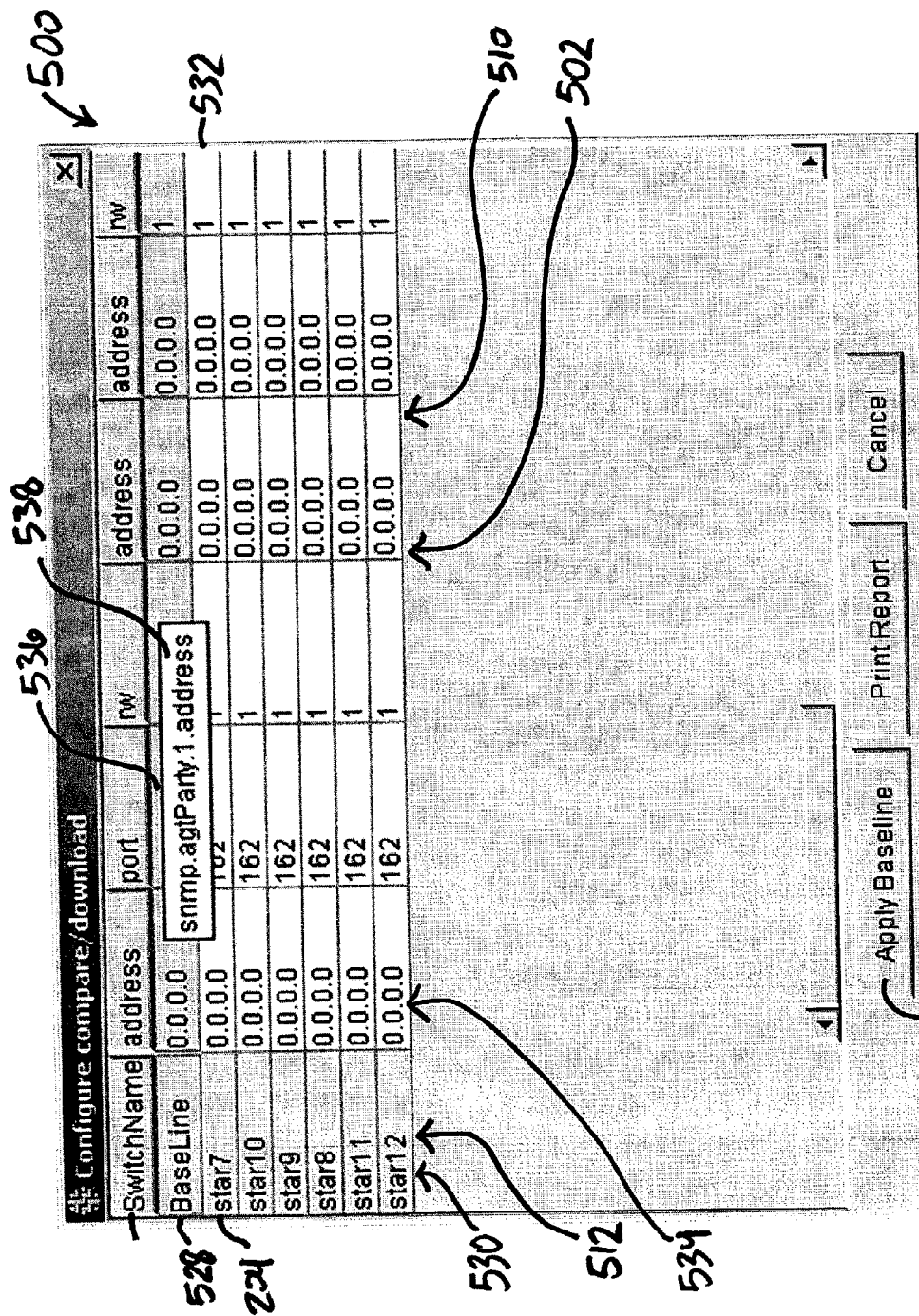
FIG. 5 is a view of a graphical user interface showing a table of configuration parameters for a group of devices in a network.

The interface 200, together with the aspects shown in FIG. 3, may form the basis of a more general graphical display (e.g., as shown in FIG. 5). For example, the title 216 of the interface window 200 depicted in FIG. 2 is titled, "Pick a base line target switch." As the title indicates, a user is prompted to select a switch (e.g., switch 204) from the expandable tree 214. When a switch such as 204 is selected, information 202 corresponding to the switch. 204 is shown in table 210. In this example, selection arrows 215 and 216 can be used by a user to add a row representing the selected switch 204 to the table 210. Similarly, a row can be selected and then removed from table 210 by selecting arrow 216.

A group of devices can be selected to be compared with the "baseline" selection of FIG. 2. For example, referring to FIG. 3, a view is shown of a graphical user interface 300 showing a table 310 of configuration parameters 302 for a group of devices 312 in a network. In the example shown in FIG. 3, device 204 is not selected individually, but instead a branch symbol 312 is selected that represents a group of devices including device 204. The group of devices 312 shown in table 310 are switches in a Fibre Channel SAN. The Silkworm™ family of network switches from Brocade Communication Systems, Inc., is an example of such devices commonly used in the computer network industry. The table 310 thus displays rows for each device represented by symbol 312. In this example, a first column 322 displays as IP address for each selected device on the network. A second column 324 displays a name for each selected device on the network, and a third column 326 displays a status for each selected device on the network.

In the context of this invention, "baseline" refers to an initial determination of the state of a device, e.g., how the parameters of the device are configured and what other devices in the network the device is connected to. As one example, a baseline could represent a single device such as a switch, and the configuration parameters of associated with the device. As another example, a baseline could represent a multi-dimensional array of information, such as a group of devices and the configuration parameters associated with each. In the context of this invention, the term "configuration parameter" is used generically in various ways, for example to refer to the identity of a parameter, the value of a parameter, or a name-value pair describing both the identity and value of a parameter. Example devices are Silkworm Fibre Channel switches from Brocade Communications Systems or Sphereon Fabric Switches from McData, Corp. Example parameters are E_D_TOV, R_A_TOV or SNMP Trap for use with most switches or proprietary parameters such as buffer-to-buffer credit (BBCredit); E port down (down), which sets an alert level for number of times an E port is not operational; or E port sync (sync), which sets an alert level for the number of times an E port loses synchronization. It is understood that there are more possible devices and many more possible parameters.

Figure 4:
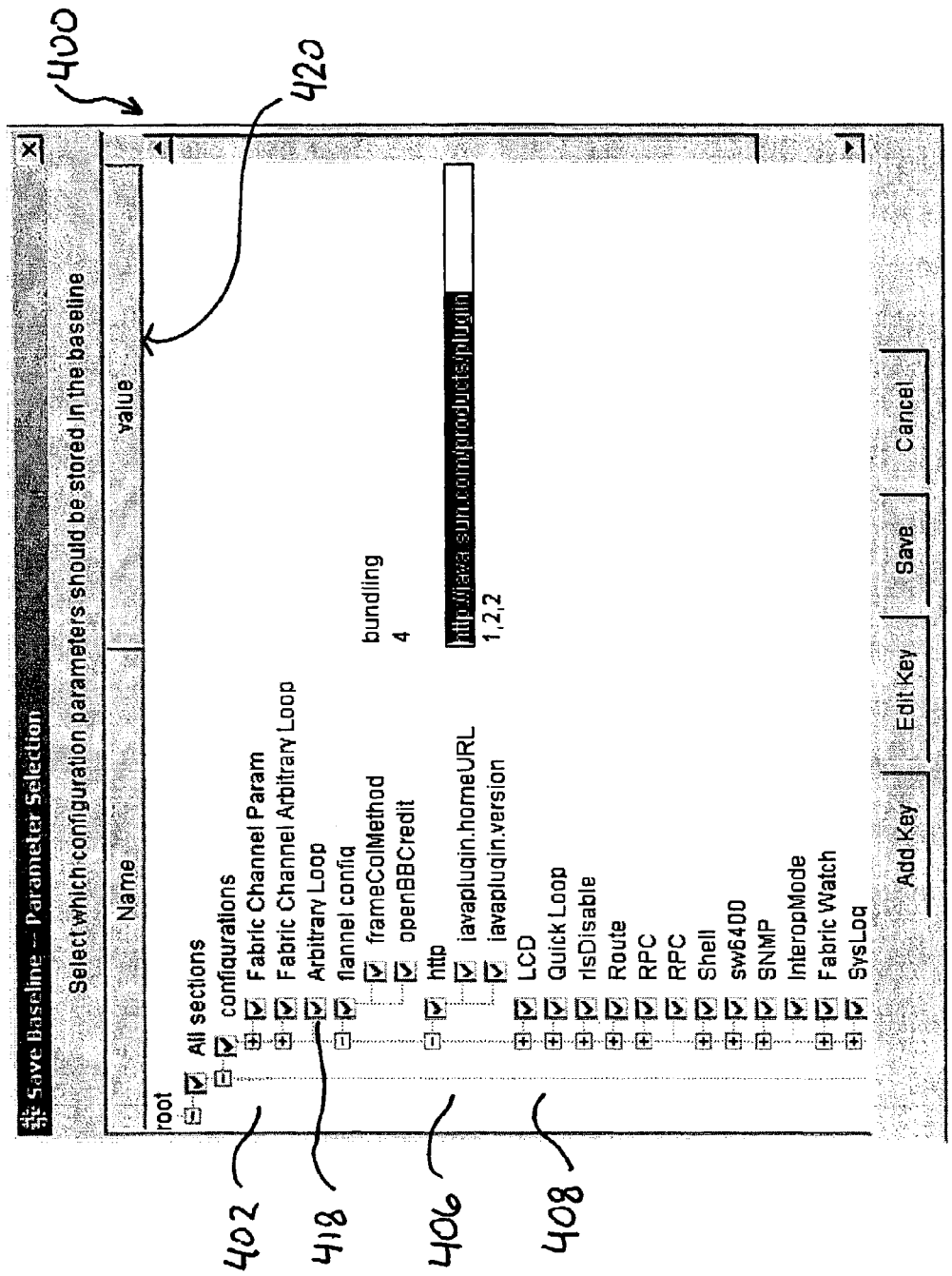
FIG. 4 is a view of a graphical user interface showing a menu of user selectable device parameters.

Referring to FIG. 4, a view is shown of a graphical user interface 400 showing a menu 406 of user selectable device parameters 408. As an example, with respect to the interface 500 shown in FIG. 5 discussed below, interface 400 can be used to select the parameters 502 that are shown in the various columns of table 510 in the interface 500. A user can achieve this by accessing interface 400 and checking the selection boxes 418 for the configuration parameters 402. The configuration parameters 402 are accessible in the form of an expandable tree 414. In some cases, a baseline value can be assigned to the parameters 402 selected. For example, the "value" column 420 shows certain values assigned to parameters.

Referring to FIG. 5, a view is shown of a graphical user interface 500 showing a table 510 of configuration parameters 502 for a group of devices 512 in a network. Table 510 conveys a comparison of the devices 512 from their state in the baseline, as selected with respect to FIGS. 2, 3 and 4. For example, once the baseline parameters are selected and the interface 500 of FIG. 5 is initiated, the baseline parameters are listed along row 528. The names of the various devices 512 that have been queried to form the baseline (See FIG. 3) are shown in column 530 below the baseline row 528. As an example, the parameters of device 204, which has been selected as part of the baseline measurement, are listed along row 532. The baseline row 528 in this example is displayed in a different mode from the non-baseline rows such as row 532. As examples of different display "modes," also referred to as displaying pieces of information in an altered manner with respect to each other, rows can be displayed in different colors, translucency, shading, etc. Common parameters between the devices 512 are listed in common columns. For example column 530 lists the names of the devices, whereas column 534 lists a network address for each device, etc.

In the example shown in FIG. 5, when a particular cell 536 in table 510 is selected, a pop-up window 538 shows a greater level of detail for the cell. In this example, selected cell 536 is a port parameter of the baseline, and so window 538 displays an identity of the port has been recorded as part of the baseline.

Figure 6:
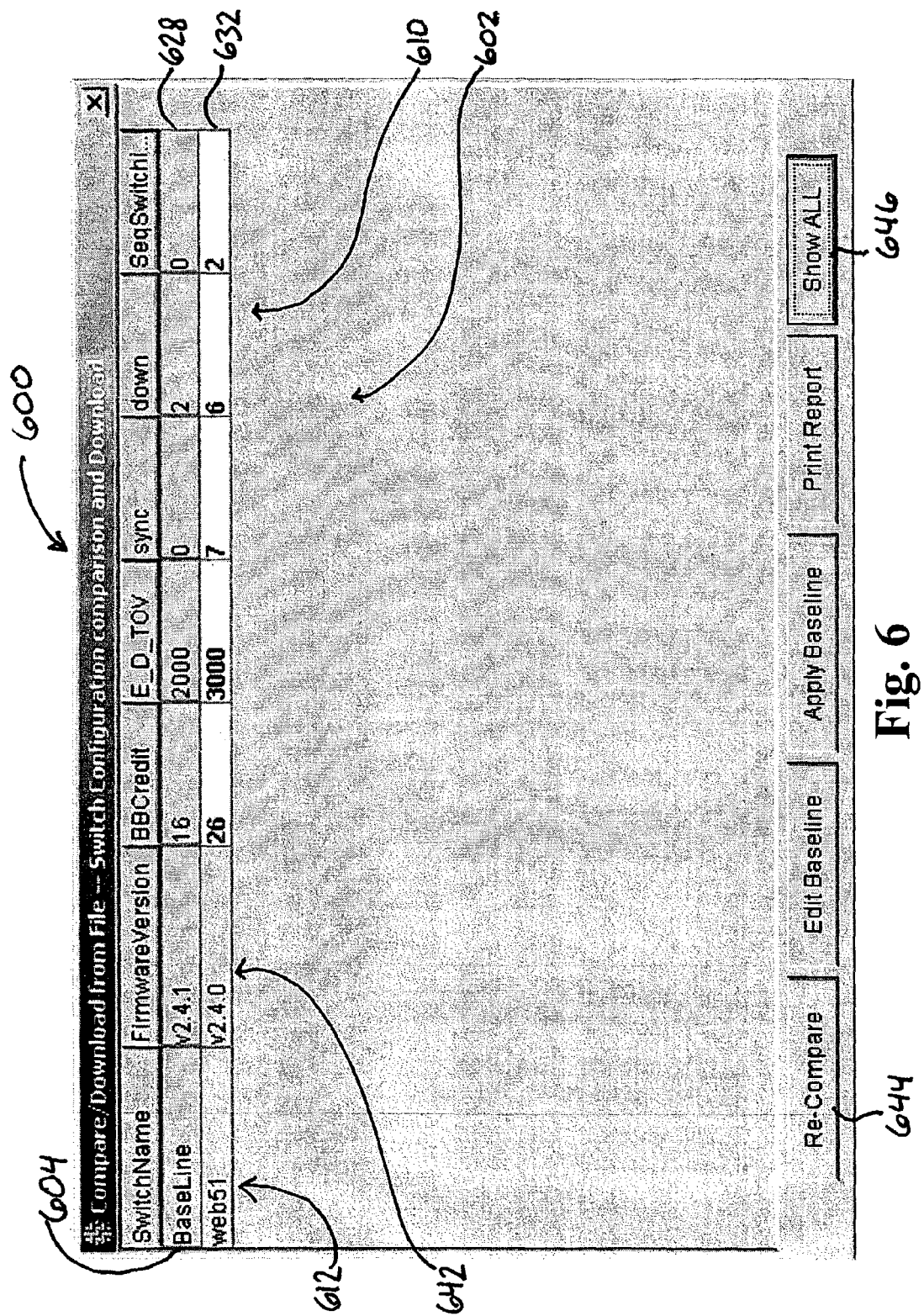
FIG. 6 is a view of a graphical user interface showing a table of configuration parameters for a group of devices in a network.

An additional feature of interface 500 is provided by user selected option 540, which provides an option to perform a comparison of the baseline parameters 528 with the parameters of devices 512. Referring to FIG. 6, a view is shown of a graphical user interface 600 showing a table of configuration parameters 602 for a group of devices 612 in a network (a different set of devices is shown in FIG. 6 than what is shown in FIG. 5). When a comparison command such as option 540 is selected, a new display is generated, as shown in FIG. 6. A re-comparison option 640 may also be selected to renew such a comparison.

In FIG. 6, a set of baseline parameters are displayed on row 628, and a set of parameters for a device 604 are compared on row 632 to the baseline. In this example, the display of the baseline parameters is shaded with respect to the parameters for the device 604. In some embodiments of the invention, only certain parameters are compared in this way, for example as selected by a user. For example, the parameters displayed in column 642 are displayed in the same manner (e.g., the same color or same degree of shading), whereas some of the parameters of row 632 are rendered in an altered manner with respect to the baseline row 628 to highlight differences from the baseline.

Figure 7:
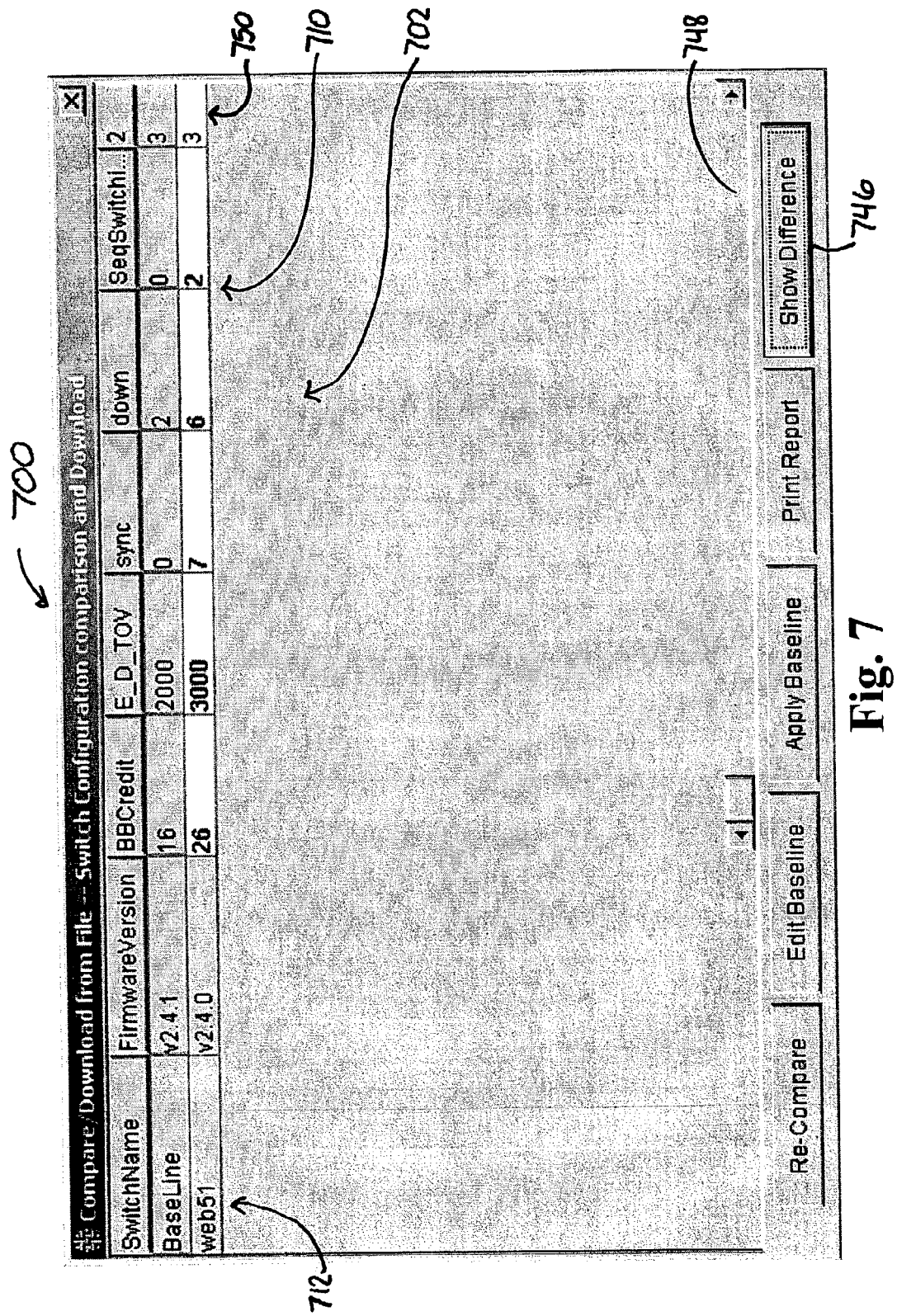
FIG. 7 is a view of a graphical user interface showing a table of configuration parameters for a group of devices in a network.

In some embodiments of the invention, as shown in FIG. 6, the parameters in rows 628 and 632 can be compared, and columns containing identical values can be eliminated (e.g., to provide an abbreviated view). In this way, the user only sees the values that have changed from the baseline. This can provide increased efficiency in managing a group of network devices where it is desired only to review the differences between network devices, where the original setup configurations were different, or where changes have occurred with the devices over a period of time. In cases where it is desired to view not just the changes, but all of the parameters of a set of selected devices, the interface 600 provides an option 646 by which the interface 600 does not eliminate columns containing identical values. Referring to FIG. 7, such a view is shown of a graphical user interface 700 showing a comprehensive table 710 of configuration parameters 702 for a group of devices 712 in a network. Scroll bar 748 can be used to scroll through a greater number of columns of parameters 702 than can be displayed on the interface 700 at one time. For example, column 750 of table 710 is partially shown, and can be fully shown by using scroll bar 748. An option 746 is provided whereby the abbreviated view of FIG. 6 can be selected. For example, column 750, which represents no change from the baseline, is shown in FIG. 7, but not FIG. 6.

Referring back to the example shown in FIG. 6, the "Re-Compare" option 644 can be selected to renew the comparison with the baseline. In a sense, the baseline can be considered as a determination of the interconnections and configurations of selected devices and parameters at a first time, whereas the additional rows displayed on an interface table represent the devices and parameters at a second time.

The interface 600 shown in FIG. 6 can thus be described in terms of various methods of operating a graphical interface, or of displaying configuration parameters of selected network devices. For example, with respect to FIG. 6, a method is provided for displaying parameters 602 of a plurality of devices 612 in a network for comparison, where each device has a plurality of parameters (e.g., as reported along row 632). A first step includes determining and storing values for a plurality of parameters 628 for each of a plurality of the devices 612. A second step includes displaying a table 610 of said stored parameter values 628, where the parameters form a first dimension (e.g., a row) of the table 610, and the devices form a second dimension (e.g., a column) of the table 610. It will be appreciated that in some embodiments, the first dimension can be a row while the second dimension is a column, and conversely, in other embodiments, the first dimension can be a column while the second dimension is a row. The terms first dimension and second dimension are thus used in a relative sense.

In some cases, additional steps may include determining if values for a parameter for each of said plurality of devices (e.g., a column of table 610) are identical, and displaying the table 610 without the parameter if all the values for the parameter are identical. In other cases, additional steps may include displaying in a first row (e.g., row 628) of the table 610 the plurality of parameters for a first device (which can either be a device, or a baseline of devices as shown in FIG. 6), and displaying in a second row 632 of the table 610 the plurality of parameters for a second device (which, e.g., can be the same device as in row 628, but at a different time, or can be a set of devices to be compared with a baseline). In some cases, the methods and interface systems under the invention can be used to compare entire fabrics of switches, as associated with a SAN or multiple SAN's.

Some embodiments may also include rendering a first parameter (e.g., a network address) common to a first device and a second device (e.g., two switches or one switch at different times) in a first column; rendering a first value for the first parameter representing the first device in the first row; rendering a second value for the first parameter representing the second device in the second row; and altering the appearance of the second value in the display with respect to the first value when the values are not identical. As previously indicated, "altering the appearance" can refer to a difference in color, translucency, shading, etc.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method for displaying parameters of a plurality of interconnected devices in a switching network for comparison, where each device has a plurality of selectable parameters, the method comprising:
    determining and storing values for a plurality of selectable parameters for each of a plurality of interconnected devices in a switching network;
    displaying a table of said stored parameter values, where the parameters form a first dimension of said table and the devices form a second dimension of said table;
    determining if values for a parameter for each of said plurality of interconnected devices are identical; and
    displaying the table without the parameter if all the values for the parameter are identical.

2. A method of displaying network device configuration data, comprising:
    determining, at a first time, a set of configuration parameters for a device, wherein the set includes at least one configuration parameter;
    storing the results of the step of determining at a first time as a baseline reference;
    determining, at a second time, the set of configuration parameters for the device;
    comparing the results of the step of determining at a second time with the baseline reference; and
    rendering onto a graphical user interface a table representing a comparison of the results of the step of determining at a second time with the baseline reference.

3. The method of claim 2, further comprising:
    determining if a value for a parameter of the device at the first time is identical to a value for the parameter of the device at the second time; and
    displaying the table without the parameter if the value of the parameter is the same at the first and second times.

4. The method of claim 2, wherein the device is a Fibre Channel switch.

5. The method of claim 2, wherein the set of configuration parameters includes at least R_A_TOV.

6. The method of claim 2, wherein the set of configuration parameters includes at least E_D_TOV.

7. The method of claim 2, further comprising:
    displaying in a first row of the table the plurality of parameters for the first device at the first time; and
    displaying in a second row of the table the plurality of parameters for the device at the second time.

8. The method of claim 2, further including:
    providing a menu of user selectable device parameters, wherein the steps of determining at a first time and determining at a second time each include determining a value of at least one parameter selected from the menu of user selectable device parameters, and wherein the table does not include non-user selected parameters.

9. A method of displaying network device configuration data, comprising:
- defining a group of devices according to user input from a graphical user interface, wherein the devices each have at least one configuration parameter;
- determining, at a first time, the interconnections and configuration parameters for the group of devices;
- storing the results of the step of determining at a first time as a baseline reference;
- determining, at a second time, the interconnections and configuration parameters for the group of devices;
- comparing the results of the step of determining at a second time with the baseline reference; and
- rendering onto the graphical user interface a table representing a comparison of the results of the step of determining at a second time with the baseline reference, wherein the table has a first dimension and a second dimension, wherein the group of devices are listed in the first dimension, and wherein at least one configuration parameter is listed for each device in the second dimension.

10. The method of claim 9, further comprising:
- determining if values for a common parameter of each device in the group of devices are identical; and
- displaying the table without the common parameter if all the values for the common parameter are identical.

11. The method of claim 9, wherein the group of devices includes a Fibre Channel switch.

12. The method of claim 9, wherein the configuration parameters for the group of devices includes at least R_A_TOV.

13. The method of claim 9, wherein the configuration parameters for the group of devices includes at least E_D_TOV.

14. The method of claim 9, further including:
- providing a menu of user selectable device parameters, wherein the steps of determining at a first time and determining at a second time each include determining a value of at least one parameter selected from the menu of user selectable device parameters, and wherein the table does not include non-user selected parameters.

15. A method of displaying network device configuration data, comprising:
- storing a baseline configuration for a device at a first time, wherein the configuration includes at least a first parameter of the device;
- determining an updated configuration for the device at a second time; and
- displaying onto a graphical user interface a comparison of the baseline configuration with the updated configuration, wherein the comparison includes a table having at least a first column and a second column, wherein the baseline configuration is rendered in a first row, wherein the updated configuration is rendered in a second row, and wherein the first parameter is provided in the first and second rows of the second column.

16. The method of claim 15, further comprising:
- determining if a value for the first parameter of the device at the first time is identical to a value for the first parameter of the device at the second time; and
- displaying the table without the first parameter if the value of the parameter is the same at the first and second times.

17. The method of claim 15, wherein the device is a Fibre Channel switch.

18. The method of claim 15, wherein the first parameter includes R_A_TOV.

19. The method of claim 15, wherein the first parameter includes E_D_TOV.

20. The method of claim 15, further including:
- providing a menu of user selectable device parameters, wherein the steps of storing a baseline configuration and determining an updated configuration each include determining a value of at least one parameter selected from the menu of user selectable device parameters, and wherein the table does not include non-user selected parameters.

21. A method of displaying network device configuration data, comprising:
- storing a baseline configuration for a device at a first time, wherein the baseline configuration includes at least a first parameter of the device;
- determining an updated configuration for the device at a second time; and
- displaying onto a graphical user interface a comparison of the baseline configuration with the updated configuration, wherein the comparison includes a table having at least a first column and a second column, wherein the baseline configuration is rendered in a first row, wherein the updated configuration is rendered in a second row, wherein the first parameter is provided in the first and second rows of the second column; and wherein a change of the first parameter between the baseline configuration and the updated configuration is indicated by an altered appearance of the first parameter rendered in the second row with respect to the appearance of the first parameter rendered in the first row.

22. The method of claim 21, further comprising:
- determining if a value for the first parameter of the device at the first time is identical to a value for the first parameter of the device at the second time; and
- displaying the table without the first parameter if the value of the parameter is the same at the first and second times.

23. The method of claim 21, wherein the device is a Fibre Channel switch.

24. The method of claim 21, wherein the first parameter includes R_A_TOV.

25. The method of claim 21, wherein the first parameter includes E_D_TOV.

26. The method of claim 21, further including:
- providing a menu of user selectable device parameters, wherein the steps of storing a baseline configuration and determining an updated configuration each include determining a value of at least one parameter selected from the menu of user selectable device parameters, and wherein the table does not include non-user selected parameters.

* * * * *